United States Patent
Nahmiyace et al.

(10) Patent No.: US 9,769,440 B2
(45) Date of Patent: Sep. 19, 2017

(54) DEVICE FOR PROJECTING A LUMINOUS BEAM FOR EXTERIOR LIGHTING FOR AIRCRAFT

(71) Applicant: ZODIAC AERO ELECfRIC, Montreuil (FR)

(72) Inventors: Michael Nahmiyace, Nogent S/Marne (FR); Christian Tsao, Rosny Sous Bois (FR); Antonio Simao, Villeneuve la Garenne (FR)

(73) Assignee: Zodiac Aero Electric, Montreuil (FR)

( * ) Notice: Subject to any disclaimer, the term of this patent is extended or adjusted under 35 U.S.C. 154(b) by 0 days.

(21) Appl. No.: 14/571,788

(22) Filed: Dec. 16, 2014

(65) Prior Publication Data

US 2015/0172611 A1 Jun. 18, 2015

(30) Foreign Application Priority Data

Dec. 16, 2013 (FR) ...................... 13 62653

(51) Int. Cl.
*B64D 47/02* (2006.01)
*H04N 9/31* (2006.01)
*B64D 47/06* (2006.01)

(52) U.S. Cl.
CPC ........... *H04N 9/3164* (2013.01); *B64D 47/02* (2013.01); *B64D 47/06* (2013.01); *H04N 9/3161* (2013.01)

(58) Field of Classification Search
CPC ......... B54D 47/06; B54D 47/02; B64D 47/02
USPC .............................................. 353/12, 13, 30
See application file for complete search history.

(56) References Cited

U.S. PATENT DOCUMENTS

| | | | | |
|---|---|---|---|---|
| 1,709,620 A | * | 4/1929 | Junkers | G09F 21/06 340/981 |
| 8,651,664 B2 | * | 2/2014 | Harvey | G03B 21/145 244/117 R |
| 8,933,819 B1 | * | 1/2015 | Garrettson | B64D 45/00 340/945 |
| 2010/0302072 A1 | * | 12/2010 | Larcher | B60Q 1/50 340/945 |
| 2011/0188257 A1 | * | 8/2011 | Sidler | B64D 47/02 362/470 |

FOREIGN PATENT DOCUMENTS

| | | |
|---|---|---|
| EP | 2549329 | 1/2013 |
| WO | 01/33865 | 5/2001 |
| WO | 02/44809 | 6/2002 |

OTHER PUBLICATIONS

French Search Report for FR Patent Application No. 1362653.

* cited by examiner

*Primary Examiner* — William C Dowling
(74) *Attorney, Agent, or Firm* — Mark R. DeLuca; Meyertons, Hood, Kivlin, Kowert & Goetzel, P.C.

(57) ABSTRACT

This device for projecting luminous beams for exterior lighting for aircraft comprises a luminous source adapted to be mounted on the aeroplane so as to project the said beam onto an exterior lighting surface.
The luminous source comprises a video image projector (2).

14 Claims, 2 Drawing Sheets

DEVICE FOR PROJECTING A LUMINOUS BEAM FOR EXTERIOR LIGHTING FOR AIRCRAFT

Figure 1:
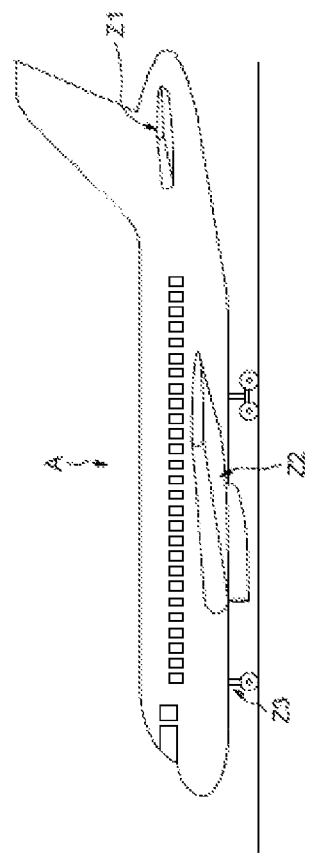

The invention relates, generally, to lighting equipment aboard aircraft and, more particularly, the equipment for exterior lighting for aircraft.

As is known, aircraft are equipped with a certain number of devices for exterior lighting which are intended to be used either during flight phases, or on the ground, for example during rolling phases or while parking.

Lighting devices for aircraft therefore ensure a signalling function and a lighting function. As regards the lighting function, this involves in particular improving the visibility of zones of the lift-off and landing runways and of the tarmac.

At night, during the phases of landing, takeoff, rolling on a runway or on a taxiway, the lighting devices are used successively or simultaneously to allow the pilot to identify the space in which he must manoeuvre at night.

Moreover, while parking or while rolling, it is known to use lighting devices for example provided on the tailplane of aircraft, for commercial purposes, for example to highlight or illuminate the logo of the airline.

In view of the foregoing, the aim of the invention is to propose a lighting device for aircraft capable of providing complementary lighting making it possible in particular to deliver complementary visual information when the aircraft is parking, at night, or indeed during rolling phases.

Hence the subject of the invention is, according to a first aspect, a device for projecting luminous beams for exterior lighting for aircraft, comprising a luminous source adapted to be mounted on the aeroplane so as to project the said beam onto an exterior lighting surface, and in which the luminous source comprises a video image projector.

Thus, by virtue of the use of a video image projector, it is therefore possible to considerably increase the amount of information projected onto the exterior lighting surface.

In a particularly advantageous mode of implementation, such a device makes it possible to implement a projection technology known by the term "video mapping" on the exterior surface of the aircraft, so as to render its exterior appearance attractive or during marketing campaigns, for example to promote an airline.

It may however also involve projecting video images onto other surfaces, in particular on the ground. It may for example involve projecting on the ground complementary information useful to the pilot, such as the alignment of the aircraft with respect to the runway, its speed etc., or to the ground personnel, for example to identify safety zones.

According to another characteristic of the projection device according to the invention, the luminous source furthermore comprises an assembly of at least one power lighting lamp, the said video image projector and the said power lighting lamp being disposed in a common housing.

According to yet another characteristic, in the latter case, the device comprises a system for combining the luminous fluxes arising from the projector and from the said power lighting lamp so as to deliver as output a luminous beam arising from the projector or from the said lighting lamp.

For example, the power lighting source comprises a light-emitting diode lighting source.

Preferably, the power lighting source comprises, as a variant, a laser diode lighting source.

The invention also relates, according to a second aspect, to the use of a projection device such as defined hereinabove for the projection of video images onto the exterior surface of an aircraft or on the ground, the said video image projector being placed on at least one mounting zone chosen from among the tail, the wing or the root of the wing, and the front leg of the landing gear.

Figure 2:
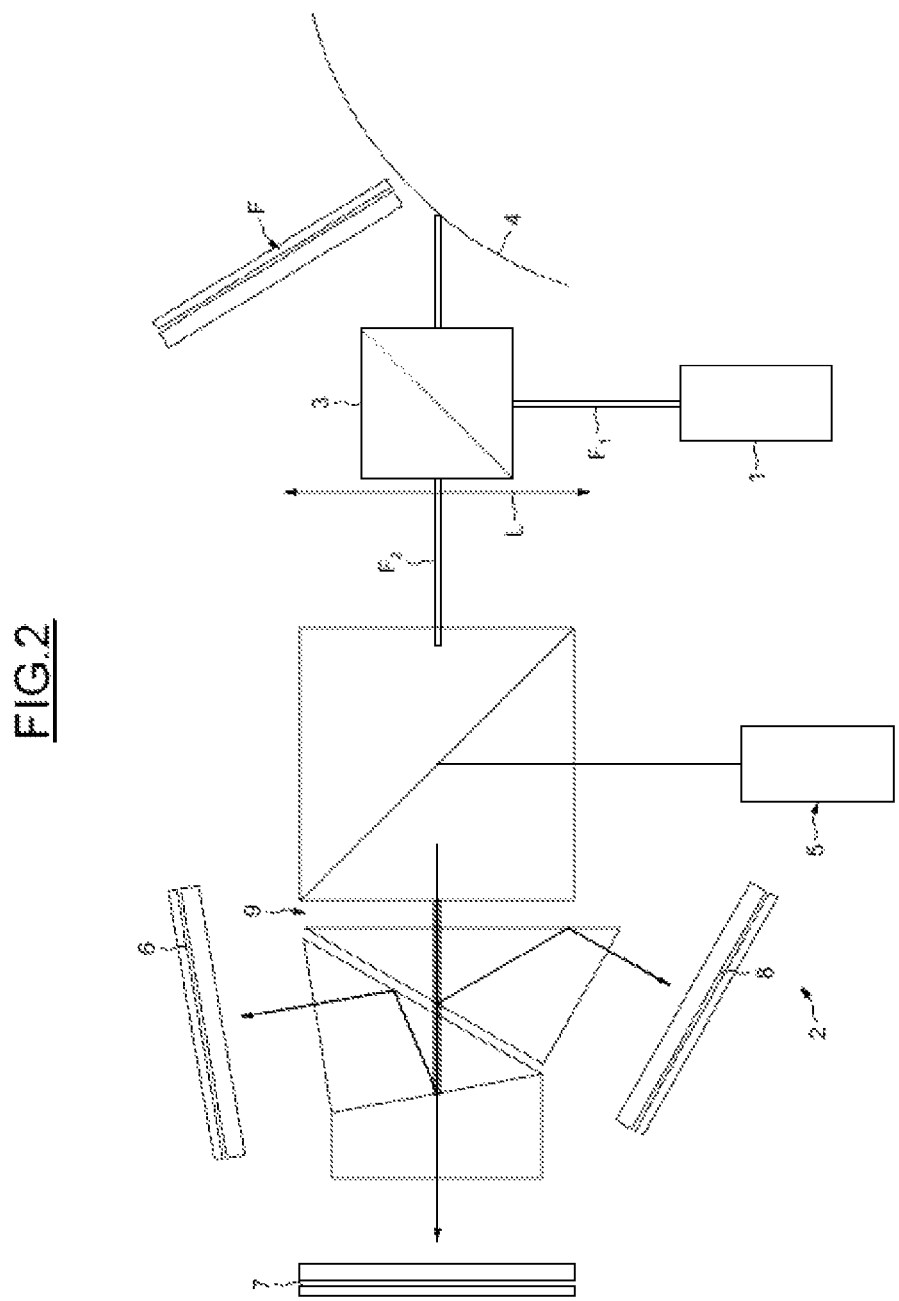

Other claims, characteristics and advantages of the invention will become apparent on reading the following description, given solely by way of nonlimiting example and with reference to the appended drawings in which:

FIG. 1 is a schematic view of an aeroplane fitted with one or more devices for projecting luminous beams in accordance with the invention; and FIG. 2 is a schematic diagram of an embodiment of a luminous beam projection device in accordance with the invention.

Reference will be made firstly to FIG. 1 in which is depicted a commercial aeroplane A in which are installed one or more projection devices in accordance with the invention.

The exemplary embodiment represented involves projecting lighting luminous beams onto the exterior surface of an aeroplane or on the ground. Of course, one does not depart from the scope of the invention when it involves projecting luminous beams for exterior lighting for any other type of aircraft.

It will nonetheless be noted that the invention finds a particularly beneficial application when the projection device is used at night when the aircraft is manoeuvring on the ground or is parked.

As indicated previously, an aircraft, in this instance an aeroplane, is fitted with a certain number of runway lighting or signalling devices making it possible to illuminate the zones of a runway or of a taxiway during rolling, landing and takeoff phases and furthermore, to provide a signalling function for the aeroplane.

The aeroplane is here fitted furthermore with one or more devices for projecting luminous beams for exterior lighting comprising a video image projector.

As seen, such a device can be provided on various zones Z1, Z2 and Z3 of the aeroplane, in particular on the tail, and more particularly on the tailplane (zone Z1), on the wing, and more particularly under the wing or above the wing and in particular at the level of the root of the wing (zone Z2), or on the front leg of the landing gear or in front of the front leg (zone Z3).

Of course, such a device can be positioned on any other appropriate mounting zone, according to the use envisaged.

Indeed, such a device, which incorporates a video projector, is intended to project video images either onto the exterior surface of the aeroplane or, generally, of the aircraft, or on the ground.

Thus, when the projection device is mounted so as to project video images onto the exterior surface of the aeroplane, it will advantageously be able to be mounted either on the tailplane (zone Z1), or on the wing (zone Z2), while being turned towards the exterior surface of the aeroplane.

Conversely, when it involves projecting video images on the ground, it will advantageously be possible to mount the projection device either under the wing (zone Z2), or on or in front of the landing gear front leg.

Thus, when the lighting surface onto which a video image is projected consists of the exterior surface of the aeroplane, the projected information may be commercial information, for example for the implementation of marketing campaigns or a luminous beam intended to highlight and to emphasize the logo of the airline, the name of the aeroplane or certain zones of the exterior surface of the aeroplane, such as the accessways.

When it involves projecting information on the ground, it preferably involves safety information, so as for example to delimit zones which must not be crossed when the aeroplane's engines are operating, or else information useful to the pilot when manoeuvring the aeroplane on the ground.

Of course, one does not depart from the scope of the invention when information of other kinds is projected, whatever the surface onto which it is projected.

It will nonetheless be noted that the use of a video projector is advantageous in so far as it makes it possible to implement a projection technique known by the term "video mapping" which makes it possible to project light or video images onto volumes, recreating images of large size on relief structures.

It will be noted that the video projector projection device aboard the aeroplane can consist of a dedicated lighting device, that is to say one which is separate from the lighting systems with which aeroplanes are conventionally equipped.

However, to reduce bulk, weight and costs, such a projection device is advantageously integrated into the lighting and signalling systems with which the aeroplane is traditionally equipped.

Represented in a schematic manner in FIG. 2 is an exemplary implementation of a luminous beam for exterior lighting projection device for aircraft in accordance with the invention, combining the use of a video image projector and the use of power lighting lamps.

The device visible in FIG. 2 therefore comprises a power lighting source 1, intended to ensure the aeroplane's traditional lighting and signalling functions, a video projector 2 intended to ensure the projection of the video images, and a combining system 3, ensuring the combining of the luminous fluxes arising from the power lighting source 1 and from the video projector 2.

Such a system for combining the fluxes is for example based on the use of a system of prisms and of light-polarizing filters so as to allow through either the flux F1 arising from the source 1, or the flux F2 arising from the video projector 2 and to direct it on passing through a lens L towards a mirror 4 so as to deliver, as output, a luminous flux to an exterior lighting surface.

It will be noted that in the exemplary embodiment represented, the projector is a projector of DLP (for "Digital Light Processing") type, with light-emitting diode, and thus comprises a video lighting source 5 with light-emitting diode and, as is conventional, an assembly of red, green and blue DLP filters, 6, 7 and 8.

As is known, according to this technology, the luminous beam arising from the source 5 is returned by a flux combining system 9 towards an assembly associating the filters 6, 7 and 8 and a DLP matrix (not represented) which alternately handle each colour so as to deliver, as output, the video flux F2.

Of course, the video content can be stored on any appropriate means, for example aboard the aircraft.

It will however be noted that one does not depart from the scope of the invention when a video projector based on other technologies is used. It will thus be noted that it is also possible, as a variant, to use a video projector with technology of LCD, DLP or DMD type using lamp, Led or laser-based luminous sources.

In particular, in the embodiment of FIG. 2, the power lighting source 1 is based on the use of light-emitting diodes. It is also possible, as a variant, to use a laser diode lighting source.

Of course, as indicated previously, the embodiment of FIG. 2 is advantageous in so far as the projection device incorporates one or more power lighting sources and a video projector. The assembly can be disposed in a common housing in order to be mounted on the aeroplane.

The invention claimed is:

1. A device for projecting luminous beams for exterior lighting for aircraft, comprising a luminous source adapted to be mounted on the aircraft so as to project the beam onto an exterior lighting surface, wherein the luminous source comprises a video image projector and an assembly of at least one power and signaling lamp, wherein the signaling lamp provides aircraft signalization functions, the video image projector and the signaling lamp being disposed in a common housing.

2. The device according to claim 1, further comprising a system for combining the luminous fluxes arising from the projector and from the said power and signaling lighting lamp so as to deliver as output a luminous beam arising from the projector or from the said power and signaling lighting lamp.

3. The device according to claim 1, wherein the power and signaling lighting source comprises a light-emitting diode lighting source.

4. The device according to claim 1, wherein the power and signaling lighting source comprises a laser diode lighting source.

5. The device according to claim 2, wherein the power and signaling lighting source comprises a light-emitting diode lighting source.

6. The device according to claim 2, wherein the power and signaling lighting source comprises a laser diode lighting source.

7. A method comprising:
projecting video images onto the exterior surface of an aircraft or on the ground using a device for projecting luminous beams for exterior lighting for aircraft, the device comprising:
a luminous source adapted to be mounted on the aircraft so as to project the beam onto an exterior lighting surface, wherein the luminous source comprises a video image projector and an assembly of at least one power and signaling lamp, wherein the signaling lamp provides aircraft signaling functions, the video image projector and the signaling lamp being disposed in a common housing.

8. The method according to claim 7, wherein the video image projector is placed on a mounting zone on the tail.

9. The method according to claim 7, wherein the video image projector is placed on a mounting zone on the wing.

10. The method according to claim 7, wherein the video image projector is placed on a mounting zone on the root of the wing.

11. The method according to claim 7, wherein the video image projector is placed on a mounting zone on the front leg of the landing gear of the aircraft.

12. The method according to claim 7, further comprising a system for combining the luminous fluxes arising from the projector and from the said power and signaling lighting lamp so as to deliver as output a luminous beam arising from the projector or from the said power and signaling lighting lamp.

13. The method according to claim 7, wherein the power and signaling lighting source comprises a light-emitting diode lighting source.

14. The method according to claim 7, wherein the power and signaling lighting source comprises a laser diode lighting source.

\* \* \* \* \*